United States Patent [19]

Hollrock et al.

[11] 3,995,759
[45] Dec. 7, 1976

[54] GOLF BALL RETRIEVER

[76] Inventors: Richard H. Hollrock; John R. Hollrock, both of 51 Longview Drive, Simsbury, Conn. 06070

[22] Filed: June 13, 1975

[21] Appl. No.: 586,736

[52] U.S. Cl. .............................. 214/356; 56/328 R
[51] Int. Cl.² ......................................... B60P 1/00
[58] Field of Search ...................... 294/19 A, 66 R; 56/328 R, 364, 400; 171/58, 63, 69; 198/210; 214/350, 353, 355, 356

[56] References Cited
UNITED STATES PATENTS

| | | | |
|---|---|---|---|
| 2,365,540 | 12/1944 | Fonken | 214/356 |
| 2,482,355 | 9/1949 | McBride | 56/328 R |
| 2,656,061 | 10/1953 | Lockie | 214/356 |
| 2,658,637 | 11/1953 | Bailey | 214/356 |
| 3,148,493 | 9/1964 | Tubbs | 56/328 R |
| 3,306,480 | 2/1967 | Wysong | 214/356 |
| 3,568,422 | 3/1971 | Thies | 56/328 R |
| 3,712,039 | 1/1973 | Avis | 56/328 R |
| 3,744,225 | 7/1973 | Reeves | 56/328 R |
| 3,784,037 | 1/1974 | Woodall | 214/356 |
| 3,788,506 | 1/1974 | Lee | 214/356 |

*Primary Examiner*—Johnny D. Cherry
*Attorney, Agent, or Firm*—McCormick, Paulding & Huber

[57] ABSTRACT

A golf ball retriever has a picker roll comprised of a plurality of thin discs spaced one from the other along a common central axis by a uniform spacing slightly less than the diameter of a golf ball. The picker roll is readily removable from its supporting frame and, after such removal, the discs making up the roll may be successively disassembled from either end thereof to reach and remove a damaged or broken disc when repairing the roll. The retriever may be particularly designed for use in retrieving balls from water hazards or for retrieving balls from land. In either case, it is highly efficient in retrieving balls, especially from depressions or pockets in the bottom surface of the water hazard or in the surface of the land over which it is moved.

16 Claims, 13 Drawing Figures

GOLF BALL RETRIEVER

BACKGROUND OF THE INVENTION

This invention relates to a device for retrieving golf balls in situations where a large number of balls are apt to become scattered over a wide area such as occurs in golf driving and practice ranges and water hazards of a golf course. More particularly, the invention relates to improvements in a golf ball retriever of the type having a picker roll comprised of a plurality of axially spaced annular members between which the balls are grasped as the roll moves over them.

Although golf ball retrievers of the type having a picker roll with axially spaced wheels or the like are well known, most of which retrievers are heavy, cumbersome and generally not efficient in retrieving balls from slight depressions in uneven terrain. Further, the wheels or other annular members of such pickers often become damaged in use so that, to maintain the efficiency of the retriever, it is necessary from time to time to repair or replace such damaged members. In most presently available retrievers, this repair or replacement is difficult to achieve and quite time consuming.

An object of this invention is, therefore, to provide a relatively light weight golf ball retriever of simple construction which is highly efficient in retrieving golf balls, particularly those lying in slight depressions or pockets in the terrain. In keeping with this object, a further object is to provide a golf ball retriever of the foregoing character having a low rolling resistance which, together with the light weight of the retriever, allows it to be easily pushed or pulled by hand or by an electric or gas driven golf cart.

A further object of the invention is to provide a golf ball retriever of the foregoing character which is so constructed as to facilitate repair and replacement of the annular members of the picker roll.

Another object of the invention is to provide a golf ball retriever which may be designed in various sizes, for pushing or pulling by hand or by various different types of powered carts or tractors, and for use either on land or in a water hazard.

Other objects and advantages of the invention will be apparent from the drawings and from the description forming a part hereof.

SUMMARY OF THE INVENTION

This invention resides in a golf ball retriever having a picker roll comprised of a plurality of generally circular thin discs arranged side by side along a common central axis. A plurality of tie rods, parallel to but radially spaced from the central axis slidably extend through the plurality of discs and each receives a plurality of equal length tubular spacers which alternate with the discs along the length of each tie rod to provide for the equal spacing of the discs along the central axis. At the opposite ends of each tie rod are two nuts which threadably engage the associated tie rods and which nuts therefore hold the discs, spacers and rods in assembly to form the complete picker roll. The picker roll is mounted to a supporting frame for rotation about the central axis by two stub shafts at opposite ends of the roll with each of the shafts extending along the central axis of the roll and having a portion extending axially outwardly beyond the associated end of the roll for cooperation with an associated bearing carried by the frame. Preferably, each stub shaft extends only through a small number, such as two or three, of the discs at the associated end of the roll and is axially held in place by means including a nut on one end thereof so that when the nut is removed from the shaft, it may be slid from the roll and from the associated bearing to free the roll from the frame.

When designed for retrieving balls from a water hazard, the retriever preferably also includes weights surrounding the stub shafts to aid in pressing the retriever downward toward the bottom surface of the hazard. The discs are relatively thin in comparison with the diameter of the golf balls so that the likelihood of a disc striking a ball dead on and riding over it without deflecting it to one side or the other are relatively small. In particular, assuming a golf ball standard diameter of 1.75 inches, the discs are approximately 0.062 inches in thickness and they are spaced apart from one to the next by spacing of about 1.625 inches.

When the retriever is designed primarily for land use, it preferably also includes a guide in front of each disc for deflecting balls away from the disc and into the space between it and one or the other of the adjacent discs. The guides are spaced from one another by a distance less than the diameter of the balls and are movable by engagement with the balls to allow the balls to move therebetween. They may be in the form of rigid pins resiliently mounted relative to the frame, resilient pins rigidly mounted to the frame, chains or resilient teeth of a rake-like part.

DETAILED DESCRIPTION OF PREFERRED EMBODIMENTS

Embodiment of FIGS. 1 to 5

Figure 1:
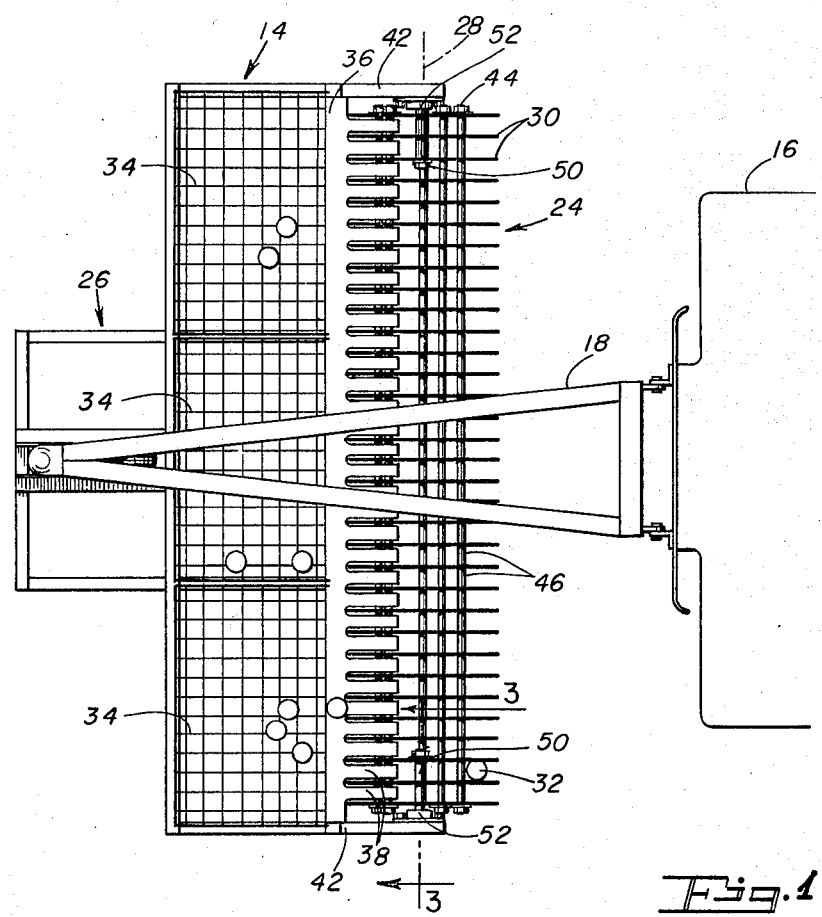
FIG. 1 is a plan view of a golf ball retriever embodying this invention and of part of a pushing vehicle.

Turning to FIGS. 1–5, these figures show a retriever, indicated generally at 14, embodying the present invention and designed primarily for use in retrieving golf balls from driving ranges, practice ranges or similar open land surfaces. The retriever 14 is further designed so as to be capable of being pushed by an electric or gas driven golf cart or similar vehicle 16 having a pushing hitch frame 18 connected to its front end. For connection with the retriever 14 the pushing frame 18 has a hitch socket 20 at its forward end which cooperates with a hitch ball 22 carried by the retriever. Of course, the retriever is not necessarily limited to this type of drive and if desired it could instead be pulled in back of a vehicle by a pulling hitch attached to the rear of a vehicle and to the ball 22.

Figure 2:
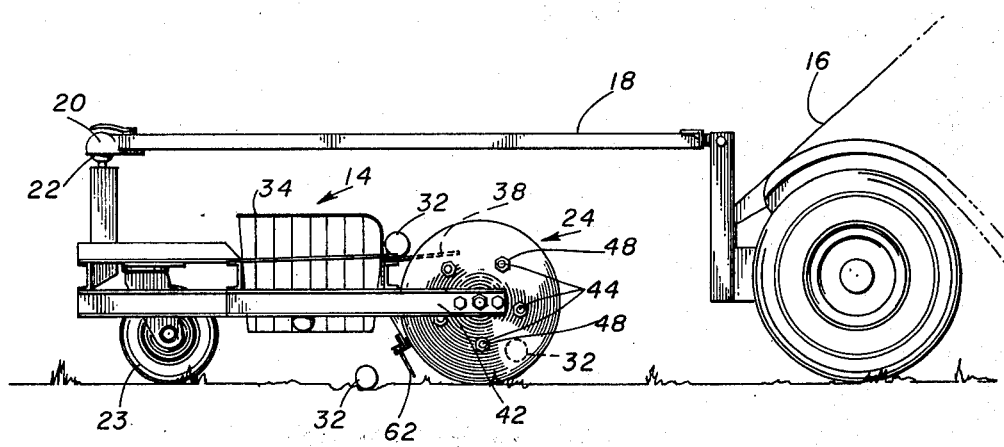
FIG. 2 is a side elevational view of the golf ball retriever and pushing vehicle of FIG. 1.

The illustrated retriever 14 includes a single picker roll 24 carried by a frame 26 for rotation about a central axis 28, but larger retrievers may include two or more such rolls arranged end to end. A single caster wheel 23 is attached to the frame 26 to keep its front end from striking the ground. Basically, the roll 24 is comprised of a plurality of axially spaced thin discs 30, 30, with flat faces, between which the balls 32, 32 become wedged as the roll rolls over them. As viewed in FIGS. 1 and 2, the retriever is pushed to the left by the cart 16 so that the roll 24 rotates counterclockwise as seen in FIG. 2. Forwardly of the roll 24, the frame 26 supports three removable wire baskets 34, 34, into which balls picked up by the roll are discharged by an extractor 36 having a plurality of extracting fingers 38, 38 extending into the spaces between the discs 30, 30, as seen in FIGS. 1 and 2.

The construction of the frame 26 may vary widely without departing from the invention so long as it includes two end pieces 42, 42 between which the picker roll 24 is mounted. Preferably, however, the frame 26 is made substantially entirely of aluminum pieces, of channel, angle or other standard section, to keep its weight as light as possible.

Figure 3:
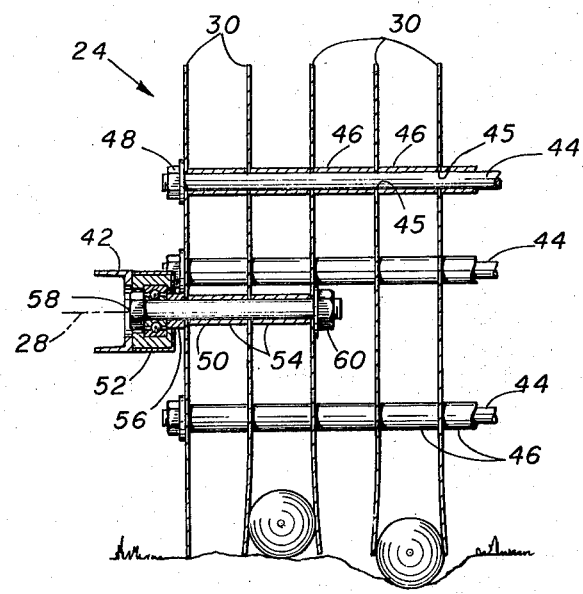
FIG. 3 is an enlarged fragmentary vertical sectional view taken on the line 3—3 of FIG. 1.

In keeping with the invention, the picker roll 24 is so constructed and mounted to the frame 26 as to enable it to be removed readily from the frame and to thereafter allow discs 30, 30 to be removed successively from either end of the removed roll for the purpose of reaching and removing any given disc from the roll for repair or replacement. In particular, the roll 24, in addition to the plurality of discs 30, 30, includes five tie rods 44, 44 each of which is parallel to the central axis 28 and extends through all of the discs 30, 30, each disc being provided with five holes 45, 45 for slidably accommodating the five tie rods. The five tie rods are radially spaced from the central axis 28 and are equally angularly spaced from one another along a common circle concentric with the axis 28. Received on each tie rod 44 are a plurality of tubular spacers 46, 46, as best seen in FIG. 3, these spacers each having a sliding fit with its associated tie rod and being of a larger external diameter than the holes 45, 45 in the discs 30, 30. The spacers are all of equal length and alternate with the discs on the tie rods to thereby accurately space the discs one from the next along the length of the rods. At each end of the roll each tie rod threadably receives a nut 48. The nuts 48, 48 are tightened on their respective tie rods so that the discs and spacers are rigidly clamped therebetween to hold the tie rods, the discs and the spacers in assembly as a unitary roll.

The roll 24 is supported from the frame 26 by two stub shafts 50, 50 at opposite ends of the roll and by two cooperating ball bearing units 52, 52 each mounted on a respective one of the frame end pieces 42, 42. FIG. 3 shows in more detail the construction of the stub shaft 50 and its associated bearing unit 52 at one end of the roll, and the construction of the stub shaft and bearing at the other end of the roll is similar to that illustrated. Referring to FIG. 3, the stub shaft 50 is colinear with the central axis 28 of the roll 24 and extends through only the first three discs 30, 30 at the associated end of the roll. The fit between the stub shaft 50 and the three discs through which it extends is a loose or sliding one. Two tubular spacers 54, 54 are slidably received on the stub shaft and each extends axially the length of a respective one of the two spaces between the three discs as shown. The stub shaft extends axially outwardly beyond the end of the roll 24 to provide an end portion which cooperates with the bearing unit 52. The outwardly extending portion of the stub shaft receives a tubular spacer 56 and the inner race of the bearing unit 52. Outboard of the inner race the stub shaft has a head 58, and at its inboard end it threadably receives a nut 60. The nut 60 is tightened on the shaft 50 and thus the inner race of the bearing, the spacer 56, and the three end discs 30, 30 and the two spacers 54, 54 are all clamped together between the head 58 and the nut 56 to rigidly connect the shaft to the remainder of the roll.

With this knowledge of the construction of the roll 24 and of its mounting to the frame 26 it will be evident that the roll may be readily removed from the frame by unscrewing the nut 60 from each stub shaft and axially sliding the shaft out of (as to the left in FIG. 3) the three associated end discs 30 and the associated bearing unit 52. After the roll is so removed, the five nuts 48, 48 at either end of the roll may be removed to allow the discs 30, 30 to be slid in succession from the tie rods to reach and remove a damaged disc which needs repair or replacement. Obviously, time and effort can be saved by removing discs from the end to which the damaged or broken disc lies closer. Also obviously, the roll need not be completely disassembled. After the roll is completely repaired and reassembled, it is readily replaced in the frame by reversing the simple procedure used in its removal.

To increase the efficiency of the retriever in picking up balls, particularly from pockets or depressions in the surface over which it is moved, the discs 30, 30 are made of a relatively thin sheet material, preferably metal, so that the thickness of each disc is very small in comparison to the diameter of a ball. Therefore, the likelihood of any disc meeting a ball head on and rolling up over it without deflecting it into the space between it and an adjacent disc are quite small. Also important is the fact that due to the thinness of the discs they will not be supported very high off the ground by grass or other ground covering and instead will tend to sink into the grass or turf to bring themselves into close contact with the earth, thereby reaching further into pockets and depressions than other retrievers made of relatively wide wheels or discs. At present, the standard diameter for a golf ball is approximately 1.675 inches. For use with golf balls of this dimension the discs 30, 30 are preferably of approximately 0.062inches in thickness and they are preferably spaced from one another by a spacing of approximately 1.625inches. As the roll is rolled over balls they become wedged between the discs and are held in such positions by the resilient gripping force of the discs until reaching the extracting fingers 38, 38 which release them from the discs and guide them to the baskets 34, 34.

In particular, the discs each have a thickness equal to no more than about one-twentieth the diameter of the balls with which they are used. Although the thinness of the discs 30, 30, as above described, tends to reduce the likelihood of the discs from riding up over balls, additional guide means are also preferably included in a retriever intended for use on land, to aid in guiding balls into the spaces between the discs and away from the discs themselves. In the retriever of FIGS. 1 to 5, this guide means consists of a plurality of rigid pins 62, 62 each located in front of a respective one of the discs 30, 30, as seen best in FIGS. 4 and 5. Each pin is further downwardly and rearwardly inclined relative to the direction of roll movement as evident in FIG. 5. The pins 62, 62 are carried by an angle section member 65 fixed to the frame 26 in front of and extending along the length of the roll. Each pin 62 extends loosely through an associated hole in the angle member 64 and has a head 66 resting on an upwardly facing surface of the piece 64. Extending over all of the heads 66, 66 of the pins 62, 62 is a strip 68 of rubber or similar resilient material carried by another angle member 70. The rubber strip 68 is lightly compressed between the pin heads and the angle member 70 so as to hold the pins in normal positions shown by the solid lines of FIGS. 4 and 5 and to allow them to be resiliently spread by contact with a ball as shown, for example, by the broken lines of FIG. 5. As will be evident from FIGS. 4 and 5, when a ball lies in advance of a pin 62, the pin will strike it and cause it to be shifted to one side or the other to avoid its being struck head on by the following disc 30 and to shift it into the space between that disc and an adjacent disc. The spacing between the pins 62, 62 is the same as that of the spacing between the discs 30, 30 and is, therefore, slightly less than the diameter of the balls; but, the resilient movement of the pins allowed by the rubber pad 68 permits deflection of the pins to enable a ball to pass between an adjacent two of them as seen in FIG. 5.

Figure 6:
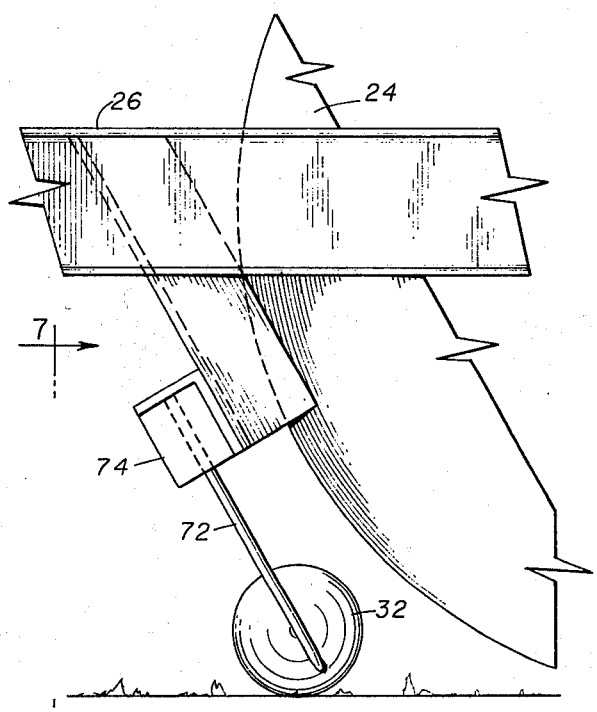
FIG. 6 is a view similar to FIG. 4 but showing a retriever having an alternate form of ball guide means.
Figure 7:
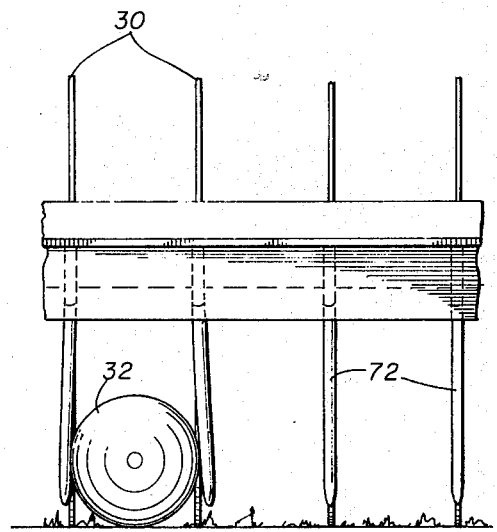
FIG. 7 is a fragmentary elevational view taken generally on the line 7—7 of FIG. 6.

Embodiment of FIGS. 6 and 7

Figure 4:
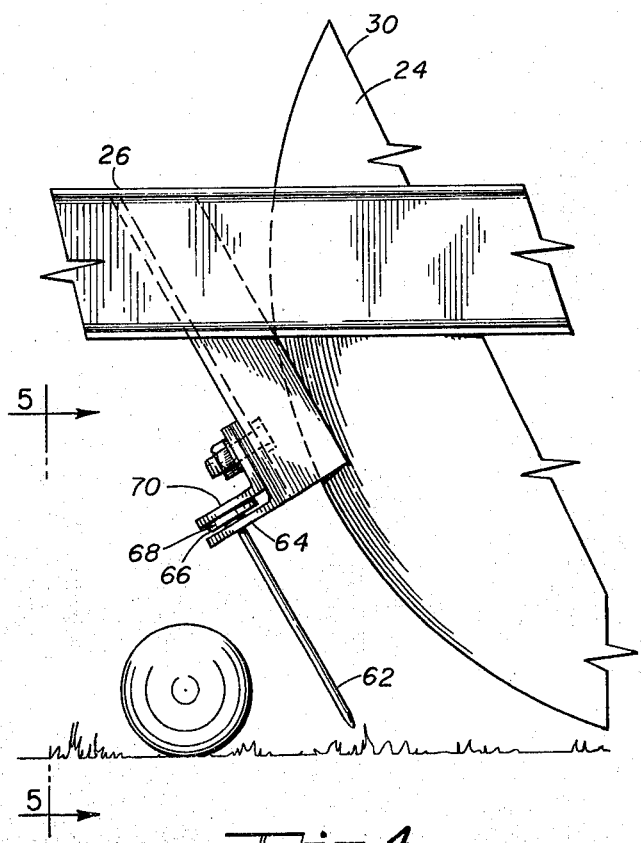
FIG. 4 is a view comprising an enlarged fragment of FIG. 2 and showing more clearly the construction of the ball guide pins used in the retriever of FIG. 1.
Figure 5:
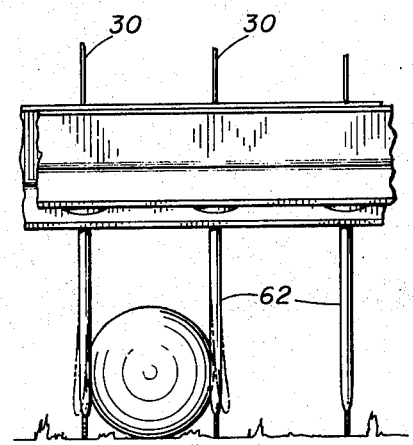
FIG. 5 is a fragmentary elevational view taken generally on the line 5—5 of FIG. 4.
Figure 10:
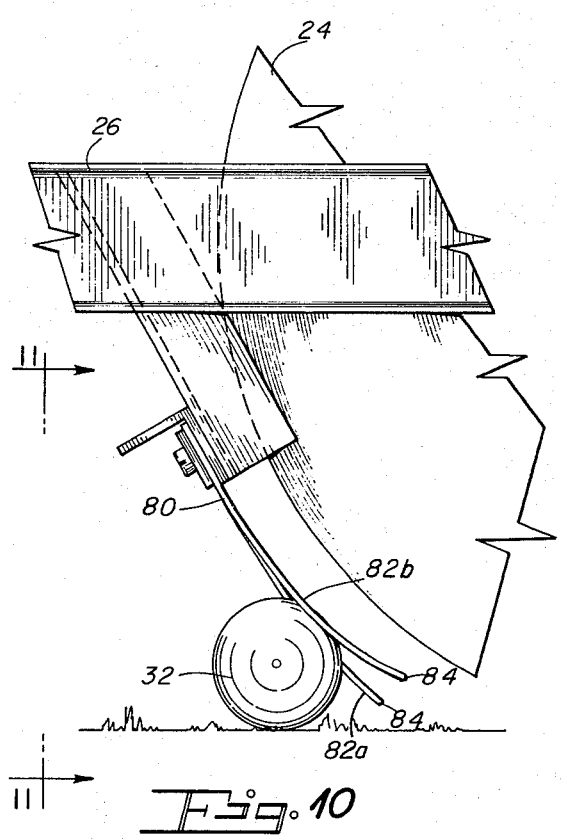
FIG. 10 is a view generally similar to FIG. 4 but showing yet another alternative form of ball guide means.
Figure 11:
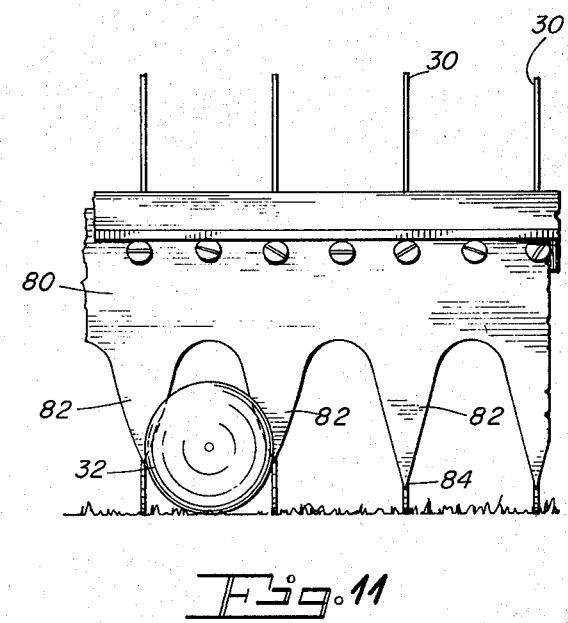
FIG. 11 is a fragmentary elevational view taken generally on the line 11—11 of FIG. 10.

Various other types of guide means may be used in place of those shown in FIGS. 4 and 5. FIGS. 6 and 7 show one other type of guide means, FIGS. 8 and 9 show another type of guide means and FIGS. 10 and 11 show still another type of guide means.

Referring first to FIGS. 6 and 7, the guide means shown by these figures consists of a series of guide pins 72, 72 each having one end mounted in a rigid bar 74 extending in front of and along the length of the roll 24. The pins 72, 72 are made of a flexible material, such as nylon or fiberglass, so that they may resiliently deflect as shown in FIG. 7 to allow the passage of a ball therebetween.

Figure 8:
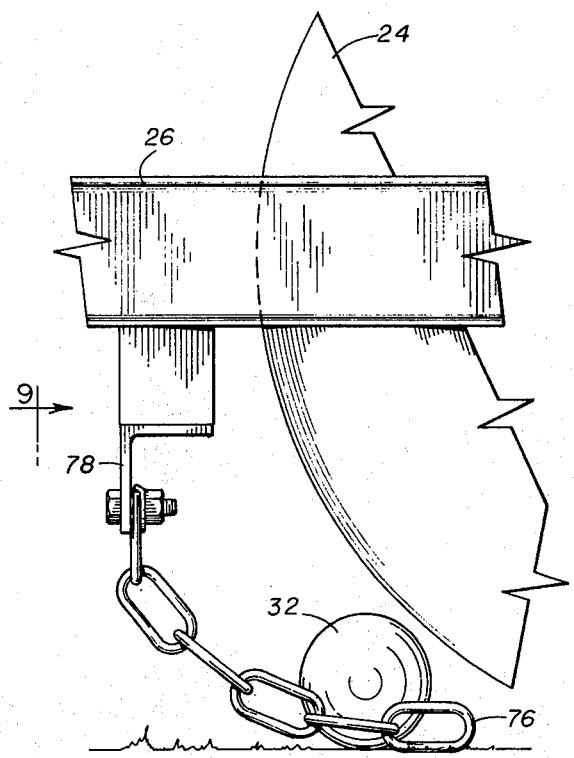
FIG. 8 is a view generally similar to FIG. 4 but showing still another alternative form of ball guide means.
Figure 9:
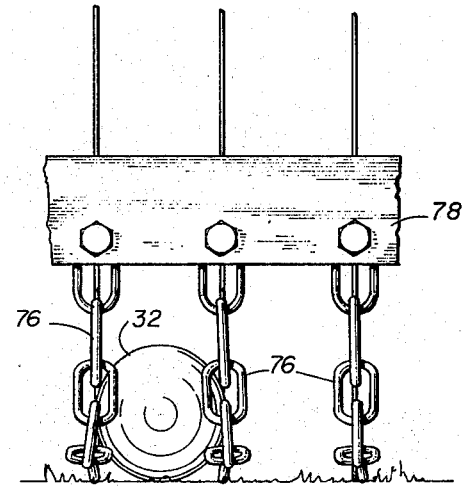
FIG. 9 is a fragmentary elevational view taken generally on the line 9—9 of FIG. 8.

Embodiment of FIGS. 8 and 9

In the construction of FIGS. 8 and 9, the guide means consists of a series of chains 76, 76 each attached at one end to an angle member 78 directly in advance of a disc 30 and of such length as to drag its free end along the ground. The chains are, of course, flexible and free to deflect to one side or another to allow the passage of a ball therebetween, a ball as it does pass between two chains being guided into the space between the associated pair of discs.

Embodiment of FIGS. 10 and 11

In the construction of FIGS. 10 and 11, the guide means consists of a rake-like member 80 carried by the frame 26 and extending along the length of the roll 24 in front thereof. The member 80 has a plurality of generally triangularly shaped elongated teeth 82, 82 each having a point 84 at its lower end aligned with an associated one of the discs 30, 30. In the normal position of each tooth 82 its pointed end 84 is spaced sufficiently close to the ground that the tooth will strike a ball lying in its path and as a result of such encounter the ball will be shifted by the tooth to one side or another and into the space between the two discs. The member 80 is made of a relatively thin resiliently flexible material, such as a sheet of thin spring steel or wear resistant plastic, so that a tooth 82 upon encountering a ball may be deflected slightly upwardly as necessary to allow a ball to pass between it and an adjacent tooth. In FIG. 10, the one tooth indicated at 82$a$ is shown in its normal undeflected position and the tooth indicated at 82$b$ is shown in a deflected position to which it has been moved by the illustrated ball 32.

Figure 12:
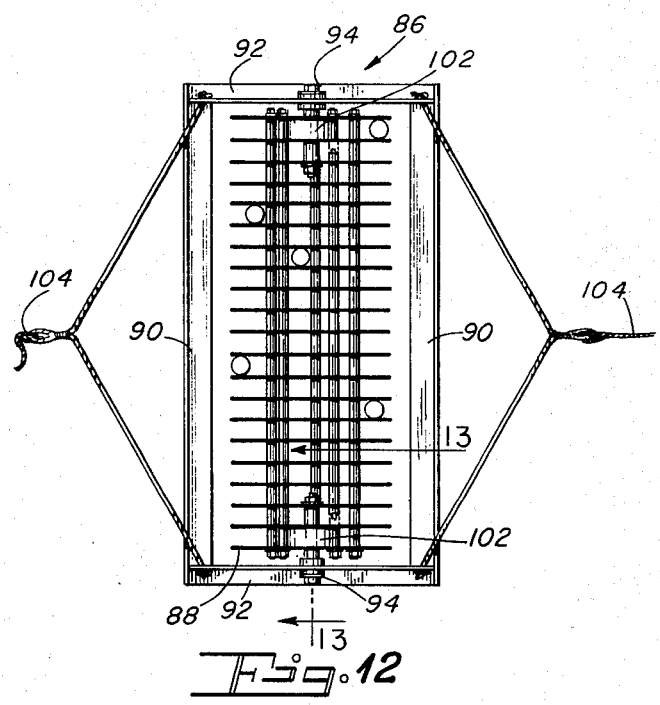
FIG. 12 is a plan view of a retriever comprising another embodiment of this invention and designed primarily for use in retrieving balls from a water hazard.
Figure 13:
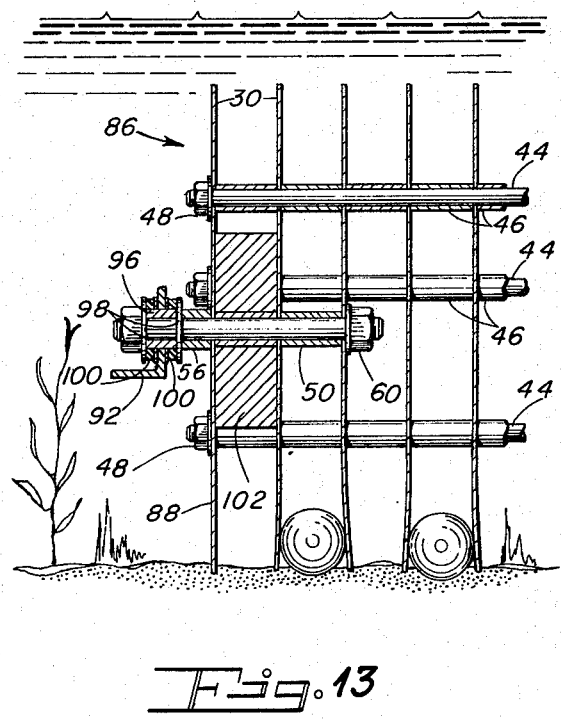
FIG. 13 is an enlarged fragmentary vertical sectional view taken generally on the line 13—13 of FIG. 12.

Embodiment of FIGS. 12 and 13

The construction of the picker roll and of its mounting to a supporting frame, as previously described, may be used in various different types of retrievers other than those shown in the preceding figures. For example, it may be incorporated into a small hand pushed device for retrieving balls from land or it may be incorporated into a device intended primarily for retrieving balls from the bottom of ponds, streams or other water hazards. A retriever of the latter type is shown, for example, by FIGS. 12 and 13, and is indicated generally at 86. The retriever 86 includes a picker roll 88 which is generally similar to the picker roll 24 of the retriever 14 of FIGS. 1 to 5, except for being of a shorter length. Accordingly, parts of the roll 88 which are similar to corresponding parts of the roll 24 have been given the same reference numerals as such corresponding parts have been given in FIGS. 1 to 5 and need not be further described.

The frame of the retriever 86 is of a simple open rectangle configuration consisting of two elongated side pieces 90, 90 and two end pieces 92, 92, the two pieces 90, 90 and the two pieces 92, 92 each being of angle section. At its opposite ends, the roll 88 is rotatably connected to the frame end pieces 92, 92 by two bearings 94, 94. These bearings could be sealed ball or roller bearing units but, preferably and as shown, each is a simple bearing comprising a sleeve 96 of bronze or the like slidably fitted on the stub shaft 50 and, in the assembled device, clamped in place on the stub shaft between two washers 98, 98 for rotation with the stub shaft in a hole in the end piece 92 through which it passes, washers 100, 100 being located on opposite sides of the end piece 92 to restrict axial movement of the roll relative to the frame.

Preferably, the retriever 86 also includes two weights 102, 102 of lead or other dense material each received on a respective one of the stub shafts 50 as shown to add additional weight to the retriever to cause its discs 30, 30 to dig deeper into the bottom of the water hazard with which it is used to improve its ball retrieving efficiency.

In use, the retriever 86 is moved through a water hazard by two ropes 104, 104 attached to opposite sides of the frame as shown, one rope being used to pull the retriever in one direction and the other rope being used to pull it in the opposite direction. Although the retriever described and claimed herein is referred to herein as a golf ball retriever, it should be understood that it is not necessarily limited to use in retrieving golf balls but may also be used in retrieving other balls, such as baseballs from baseball batting ranges and tennis balls from tennis practice courts. The invention as claimed by the following claims is, therefore, intended to include retrievers made for use with balls other than golf balls, it being understood of course that the spacing between the discs of the picker roll will have to be varied to suit the type of ball involved.

We claim:

1. A golf ball retriever comprising a plurality of generally circular discs arranged side by side along a common general central axis, a plurality of tie rods extending slidably through said plurality of discs, each of said tie rods being parallel to and radially spaced from said central axis, a plurality of tubular spacers of equal length slidably received on each of said tie rods, said spacers alternating with said discs along the length of each tie rod to space said plurality of discs equally one from the next along said common axis, means at the opposite ends of each tie rod for restraining said discs and said spacers from movement axially of said tie rods and for thereby holding said discs, said spacers and said tie rods in assembly with one another as a roll unit, two separate stub shafts located respectively at opposite ends of said roll unit, each of said stub shafts extending slidably through less than one-half of said plurality of discs along said central axis and having a portion extending axially outwardly beyond the one of said discs at the associated end of said roll unit, a frame, two spaced bearing means on said frame for supporting said roll unit from said frame for rotation relative to said frame about said central axis, each of said bearing means engaging with said outwardly extending portion of a respective one of said stub shafts, and means for releasably restraining each of said stub shafts against movement axially relative to said discs through which it passes, each of said stub shafts and its associated one of said bearing means being so constructed that when the associated releasable restraining means is conditioned to release said stub shaft said stub shaft may be shifted axially relative to the discs through which it passes and relative to said associated bearing means to disengage it from said associated bearing means and to thereby free the associated end of said roll unit from said frame.

2. A golf ball retriever as defined in claim 1 further characterized by each of said stub shafts extending through at least two of said discs, a spacer on each of said stub shafts in each of the spaces between the ones of said discs through which said stub shaft extends, and the one of said bearing means associated with each stub shaft including an annular part slidably received on said stub shaft, and two axial movement limiting means at the opposite ends of each stub shaft for limiting its movement axially relative to said bearing annular part and the ones of said discs through which it passes, one of said axial movement limiting means being removable from said stub shaft to allow said stub shaft to be axially moved from assembly with said bearing annular part and the ones of said discs through which it passes to permit removal of said roll unit from said frame.

3. A golf ball retriever as defined in claim 2 further characterized by one of said axial movement limiting means of each of said stub shafts being a nut threaded onto its shaft and which nut may be tightened to rigidly clamp between it and the other of said axial movement limiting means the parts received on its stub shaft to rigidly fix said stub shaft to said roll unit.

4. A golf ball retriever as defined in claim 2 further characterized by each of said stub shafts extending through three of said plurality of discs with each stub shaft receiving two tubular spacers each located in a respective one of the two axial spaces between said three discs through which the stub shaft passes.

5. A golf ball retriever as defined in claim 2 further characterized by each of said stub shafts having another spacer thereon between the end of said discs through which it passes and the associated bearing annular part, and one of said axial movement limiting means of each of said stub shafts being a nut threaded onto its shaft and which nut may be tightened to rigidly clamp between it and the other of said axial movement limiting means the parts received on its stub shaft to rigidly fix said stub shaft to said roll unit.

6. A golf ball retriever as defined in claim 2 further characterized by said frame being in the form of an open rectangle surrounding said roll unit and comprised of two side pieces extending parallel to said central axis and two end pieces extending perpendicular to said central axis, said two end pieces carrying respectively said two bearing means, two ropes connected with said frame unit for pulling it in opposite directions perpendicular to said two side pieces, and two weights each received on a respective one of said stub shafts and located between two of said discs.

7. A golf ball retriever as defined in claim 1 further characterized by each of said discs being made of sheet material and each of said discs having flat faces on each side, the thickness of each of said discs being less than 1/20 of the diameter of the balls with which it is used.

8. A golf ball retriever as defined in claim 7 further characterized by each of said discs having a thickness of approximately 0.062 inches and the spacing between said discs being approximately 1.625 inches.

9. A golf ball retriever as defined in claim 7 further characterized by a plurality of elongated guides carried by said frame, means mounting each of said guides to said frame so as to have a normal position relative to said frame and so as to be yieldably movable from said normal position by contact with a ball of the type with which said retriever is to be used, each of said guides in its normal position being located in front of a respective one of said discs with its longitudinal axis in the plane of its associated disc and each having an upper end adjacent said frame and a free lower end for deflecting a ball lying in the path of the associated disc to one side or another of said disc, said guides in their normal positions defining openings therebetween having dimensions less than required for the free passage therethrough of balls with which the retriever is to be used.

10. A golf ball retriever comprising a picker roll including a plurality of circular discs arranged side by side and uniformly spaced one from the next along a common central axis, a frame, and means supporting said picker roll for rotation relative to said frame about said central axis, each of said circular discs of said picker roll being made of sheet material and having two flat faces, the spacing between said discs being slightly less than the diameter of the golf balls with which said retriever is to be used, and a plurality of elongated guides carried by said frame and each associated with a respective one of said discs, means mounting each of said guides to said frame so as to have a normal position relative to said frame and so as to be yieldably movable from said normal position by contact with a ball of the type with which said retriever is to be used, each of said guides in its normal position having its longitudinal axis located in the plane of its associated disc and having an upper end located adjacent said frame and a free lower end, said guides in their normal positions defining openings therebetween having dimensions less than required for the free passage therethrough of balls with which the retriever is to be used.

11. A golf ball retriever as defined in claim 10 further characterized by each of said guides being a rigid pin, and means for resiliently mounting each of said pins to said frame.

12. A golf ball retriever as defined in claim 10 further characterized by each of said guides being a pin made of resilient material, and means rigidly mounting the upper end of each of said pins to said frame.

13. A golf ball retriever as defined in claim 10 further characterized by said plurality of elongated guides being a rake-like member made of thin sheet material, and each of said guides being a tooth of said rake-like member and being of a generally triangular shape with an apex at its lower end.

14. A golf ball retriever as defined in claim 10 further characterized by each one of said guides being a flexible chain having an upper end attached to said frame and of such a length that its free lower end drags on the ground in use.

15. A golf ball retriever as defined in claim 10 further characterized by the thickness of each of said discs being less than 1/20 of the diameter of the balls with which said retriever is to be used.

16. A golf ball retriever as defined in claim 15 further characterized by each of said guides being thicker than its associated disc.

* * * * *